Dec. 31, 1929.   F. TRANSOM   1,741,888

HEADLIGHT PROJECTOR

Filed June 27, 1925

Frederick Transom Inventor

Patented Dec. 31, 1929

1,741,888

UNITED STATES PATENT OFFICE

FREDERICK TRANSOM, OF WASHINGTON, DISTRICT OF COLUMBIA

HEADLIGHT PROJECTOR

Application filed June 27, 1925. Serial No. 40,094.

My invention relates to improvements in projector lanterns, operated by electric current, and while the improvements described will be found to be particularly efficient and applicable, as used for the head lights of an automobile, certain important features of the invention are readily adaptable to search light and signal system uses.

The problem of roadway illumination by the headlights of an automotive vehicle has become of very great importance due to the congested condition of the streets and roads used for traffic. The headlights at present in use are efficient and economical from the standpoint of one way traffic, but owing to the extreme glare they develop, it is generally agreed that most of the headlights now in use are unsafe when mounted on vehicles approaching each other under their own illumination plant.

Many improvements have been made in the reflecting surfaces and in the lens systems of head-light projectors, but the problem of glare elimination goes further back than the operation of these parts of the lighting system, it is presented in the source of light itself. Ordinarily the source of light for electrically operated headlights has been an incandescent solid, but it is well known to physicists that the light radiation from an incandescent solid is highly complex, it shows wave lengths of the full extent of the spectrum, and is moreover, very sensitive to temperature changes in the bodies emitting the radiation.

Without discussing the possibilities of glare occasioned by the use of an incandescent solid, as a source of light, it appears evident a light of the simplest possible constitution, consistent with the ability to set up a powerful field of illumination, should be used, especially for the headlights of an automobile, where true color values are not essential, but the absence of glare is all important. Such a light has been long well known in various special fields of illumination, such as work requiring a light giving the least possible eye fatigue in work shops etc. A light of this character is given off by gases and vapors when heated to incandescence and has been highly developed in the case of the mercury vapor lamp to give both excellent efficiency and light of a kind which is entirely suitable and satisfactory for many industrial applications.

I have discovered that the application of a mercury vapor lamp as a substitute for the solid filament universally used in the headlight of an automobile has resulted in a very marked diminution of glare and at the same time such a source gives a satisfactory illumination of the roadway. Besides the special suitability of the source itself from its physical characteristics of developing practically mono-chromatic light of very simple wave length properties, the mercury vapor lamp shape has been found to be exactly what is needed for use in a lantern body whose reflecting surfaces are most correct for operation of headlight projectors.

Figure 1:
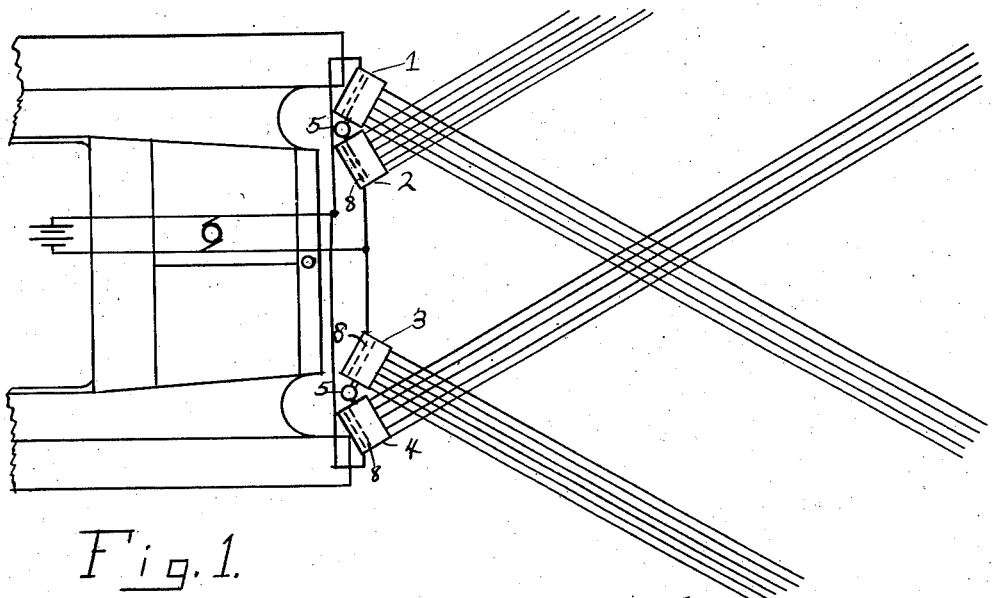
Fig. 1 shows one arrangement of my improved head-light mounted on the fore part of an automobile.

The general features of my invention will be understood from Fig. 1 of the accompanying drawing, wherein I have shown a set of headlights mounted on the front of an automobile body. I have illustrated the usual arrangement of a pair of headlights carried, one on each side of the machine near the mudguards, except that each headlight is divided into two portions. These two portions, or sections, 1 and 2, on one headlight and 3 and 4, on the other, are supported from a pin, or bracket 5, around which each section may be, if desired, independently adjustable.

The purpose of the adjustability is to set up a uniformly distributed field of illumination as indicated in the light rays leaving the headlights, but as some one given angle is most suitable for this purpose, with any given setting between the headlight centers, evidently each headlight may be made up of sections, as indicated, which are rigidly fixed in their angular setting with respect to each other. Each of the headlight sections, 1, 2 etc. consists of a lantern body whose interior reflecting surfaces are shaped as a parabolic prism, marked 12 in Fig. 3. The mercury vapor lamp 8 in Fig. 1 is mounted in the focal axis of the reflecting prism, as shown in the drawings. The light given off by the tube 8 will accordingly be reflected from the rear, and top and bottom surfaces of the lantern in straight lines through a plain glass window 11 and with a proper tilt of the bracket pin 5 will be directed in the form of a wedge shaped beam towards the road bed.

While, as above explained, I regard the vapor tube light as the highest form of non-glare illuminant source, it is obvious that the parabolic prism reflecting faces contribute materially to elimination of glare because they give the simplest possible bending of the rays of light in the desired direction, and this property can be used with advantage in combination with a solid filament ranging along the focal axis of the prism, instead of a vapor tube so located.

Figure 2:
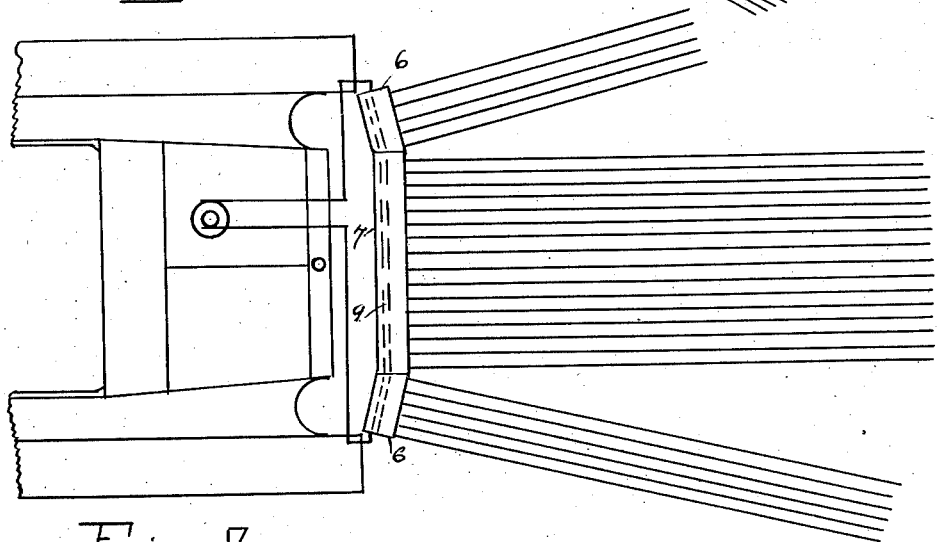
Fig. 2 illustrates a different arrangement of head-light using my invention as applied to an automobile.

Fig. 2 shows a simpler form of lantern mounting, particularly adapted for use with vapor tubes. In this form the lantern projector 7 has two integral end sections 6 which are bent slightly with respect to the center portion of the lantern. The bend is shown somewhat exaggerated and its purpose is to throw the light sideways, to increase the field of illumination. Obviously this bend might be made adjustable also, if desired.

Figure 3:
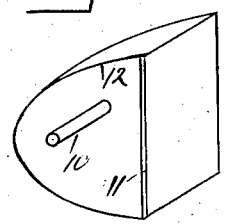
Fig. 3 is a detail showing interior structure of my improved head-light, in one form.

In Fig. 3 the mercury tube is indicated by 10. This tube ranges parallel to the glass window 11, along the focal axis of the parabolic prism 12, which may be regarded as made up of a shape generated by moving a parabola constantly parallel to the same plane along a line which contains the focus of the parabola. This may be a straight line as shown in the figures of the drawing.

The mutual inclinations of the lantern sections in Fig. 1 also contribute to the elimination of glare in that they direct the light rays usefully to the road surface, but away from the line of approaching travel, and furthermore give uniformity to the field of illumination.

Any of the well known types of vapor lamp energizations may be used adapted to either direct or alternating current supply of the light source. The lamps 8 may be separate in the different sections, or in case these sections are not adjustably mounted they may be all one tube in each lantern box as in Fig. 1. In the same way the sections of Fig. 2 may also be lit by a single tube. It is well known that these tubes may be bent to suit various directions of extent.

What I claim as my invention is:

1. In a vehicle headlight projector, windows inclined in different planes, and illuminating means for said windows comprising mercury vapor tube sections extending parallel to the windows they illuminate.

2. A vehicle headlight road lighting system consisting of a pair of spaced headlights, each headlight comprising a plurality of parabolic prism sections relatively mounted to each other and to the similar sections of the other headlight that cross-field illuminations between sections on the same headlight and sections on different headlights are set up.

3. In a mercury vapor headlight set for automobiles, spaced headlights, each of which has inclined wing sections housing a vapor tube pointing approximately end-wise to the line of automobile travel.

4. In a light projector, mutually inclined lantern sections provided with windows, and illuminating means for said windows comprising vapor tube sections extending parallel to the windows they illuminate.

FREDERICK TRANSOM.